United States Patent [19]

Saito et al.

[11] 3,716,984
[45] Feb. 20, 1973

[54] WATCH STRUCTURE HAVING PLASTIC AND METAL COMPONENTS

[75] Inventors: Toshiaki Saito, Suwa; Mamoru Miyasaka, Nagano, both of Japan

[73] Assignee: Kabushiki Kaisha Suwa Seikosha, Tokyo, Japan

[22] Filed: July 28, 1971

[21] Appl. No.: 166,752

[30] Foreign Application Priority Data

July 30, 1970 Japan..................................45/75486

[52] U.S. Cl................................................58/58, 58/59
[51] Int. Cl.................................................G04b 19/24
[58] Field of Search......58/2, 4, 5, 58, 59, 63, 67–72, 58/106

[56] References Cited

UNITED STATES PATENTS 3,283,496  11/1966  Hohenthaner.....................58/59 UX
3,002,335  10/1961  Kripak........................................58/2

*Primary Examiner*—George H. Miller, Jr.
*Attorney*—Alex Friedman et al.

[57] ABSTRACT

In a watch having both plastic and metal components and particularly where the components are gears, engagement between any metal component and any plastic component is frictional only. Engagement of teeth takes place only between metal components and metal components on the one hand and plastic components and plastic components on the other hand.

6 Claims, 1 Drawing Figure

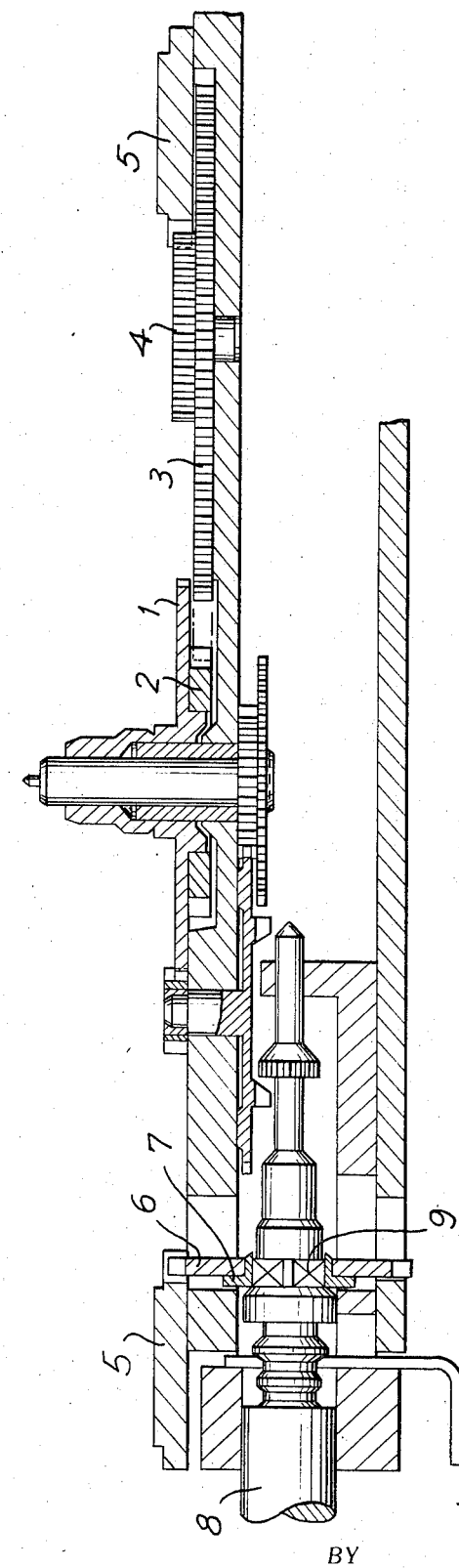

WATCH STRUCTURE HAVING PLASTIC AND METAL COMPONENTS

BACKGROUND OF THE INVENTION

In conventional watch constructions wherein both plastic and metal components are used, the teeth of plastic gears engage teeth of metal gears. Under such circumstances, the metal teeth scrape the plastic teeth so that an unacceptable degree of wear quickly ensues. Moreover, if the forces between the two types of teeth are severe, then the plastic teeth may be sheared off. Such an interengagement of plastic teeth with metal teeth is apt to occur where the date wheel of a calendar watch is made of plastic and the date correcting wheel is made of metal.

SUMMARY OF THE INVENTION

A calendar watch in accordance with the present invention is so constructed that a metal component engages a plastic component only by friction. Metal gear teeth mesh only with metal gear teeth and plastic gear teeth mesh only with plastic gear teeth.

Accordingly, it is an object of the present invention to provide a calendar watch structure including plastic components in which wear and scraping of plastic components by meshing contact with metal components is avoided.

Another object of the present invention is to provide a calendar watch construction wherein shearing of plastic gear teeth is minimized.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWING

For a fuller understanding of the invention, reference is had to the following description taken on connection with the accompanying drawing, in which:

The single FIGURE is an elevational view in partial cross section of a calendar watch in accordance with the present invention.

DESCRIPTION OF THE PREFERRED EMBODIMENT

The calendar watch shown in the FIGURE comprises an hour gear 1 and a date driving gear 2 combined in a single component with the hour gear 1. Date advancing gear 3 rotates at a much lower rate than the hour gear, making one revolution per 24 hours. Date advancing finger 4 is preferably of a single piece with the date advancing gear 3. The date advancing finger 4 makes contact with the teeth of date gear 5 and advances the date gear 5 by one tooth per day. Date correcting gear 6 engages the teeth of date gear 5 when stem 8 is in the proper position axially. Date correcting gear bushing 7 engages spline 9 which is part of stem 8.

According to the present invention hour gear 1, date driving gear 2, date advancing gear 3, date advancing finger 4, date gear 5 and date correcting gear 6 are all made of plastic. Date correcting gear bushing 7 and stem 8 are made of metal. The only metal to plastic connection occurs at the interface between date correcting gear 6 and bushing 7. The connection between them is frictional and, significantly, no relative motion therebetween occurs. Consequently there is no wear at the interface and particularly on the face of the plastic engaging the metal.

In contrast, if the date correcting gear 6 had been made of metal as in conventional watch constructions, then the teeth of the date gear 5 would be subject to scraping and possible shear by the teeth of the date correcting gear 6. A similar difficulty could occur if the date advancing finger 4 were made of metal and the date wheel 5 were made of plastic. These difficulties are avoided by the present invention in which metal components engage plastic components only by means of friction.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a calendar watch, a date setting mechanism of increased life, comprising movable plastic components having first teeth and interengaged by said first teeth, and movable metallic components having second teeth and interengaged by said second teeth, said metallic components engaging said plastic components only by friction.

2. A date setting mechanism as defined in claim 1, wherein said movable metallic components are engaged with a member operated from the exterior of said watch.

3. A date setting mechanism as defined in claim 2, wherein said member is a winding crown.

4. In a calendar watch, a date setting mechanism of increased life, comprising a metallic stem having a spline portion, a metallic bushing meshing internally with said spline portion, a plastic date correcting gear fixed by friction to the exterior of said bushing against relative motion therebetween, a plastic date gear meshing with said date correcting gear, a plastic hour gear within said date gear, a plastic date driving gear rotating conjointly with said hour gear, a plastic date advancing gear meshing with said date driving gear, and a plastic date advancing finger carried by said date advancing gear, said finger serving to move said date gear intermittently.

5. The mechanism of claim 4 further comprising an hour gear made in one piece with said date driving gear.

6. The mechanism of claim 4, wherein said date advancing finger is made in one piece with said date advancing gear.

* * * * *